Jan. 17, 1956 J. W. LIGHT 2,730,994
ACTUATOR CONTROL SYSTEM AND VALVE MECHANISM THEREFOR
Original Filed Nov. 29, 1951 4 Sheets-Sheet 1
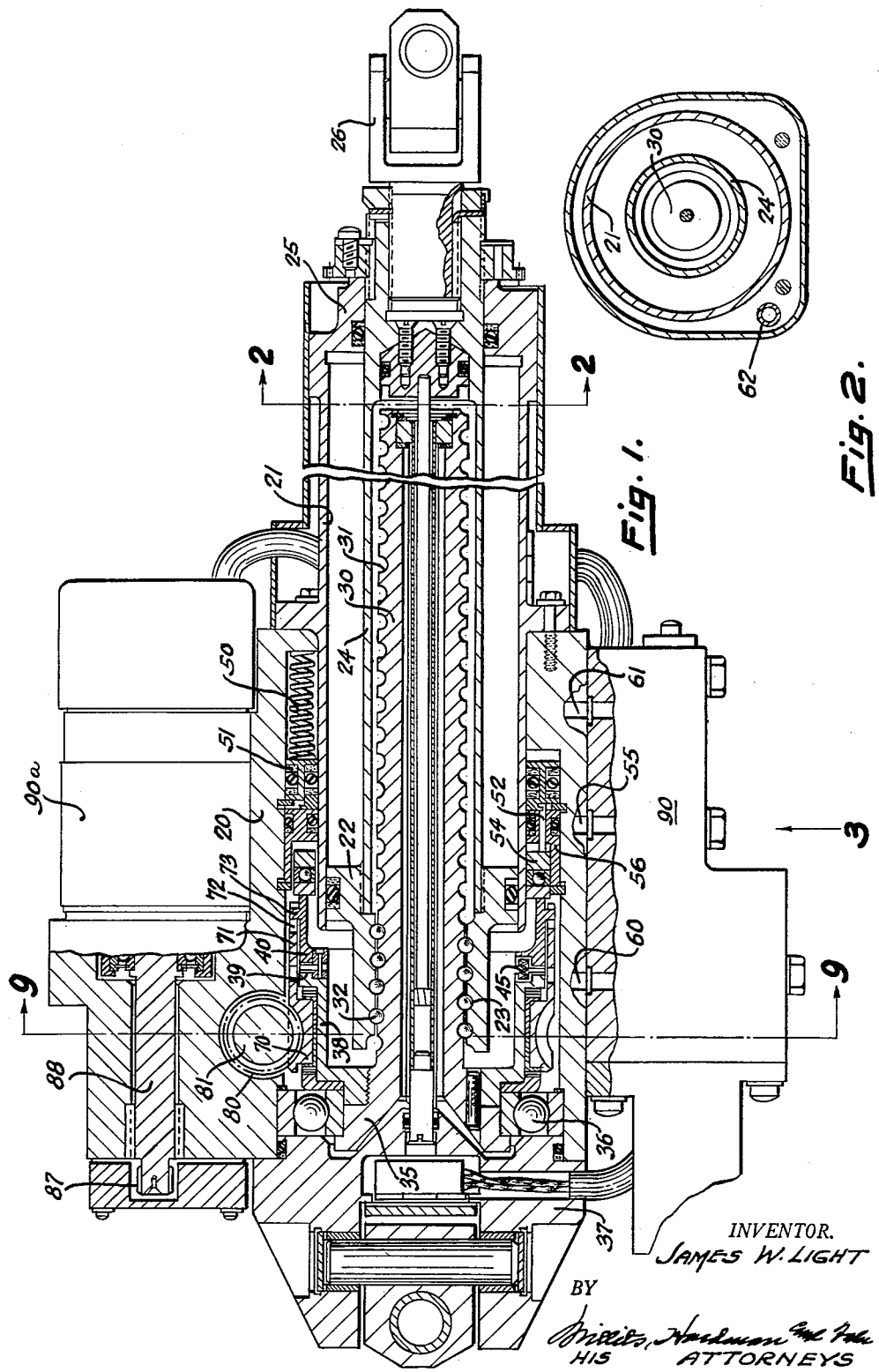
INVENTOR.
JAMES W. LIGHT
BY
HIS ATTORNEYS

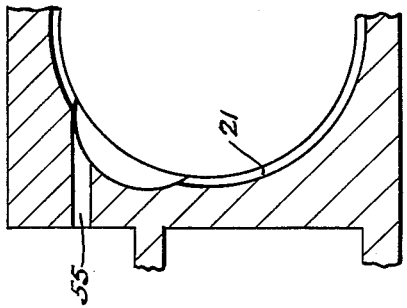
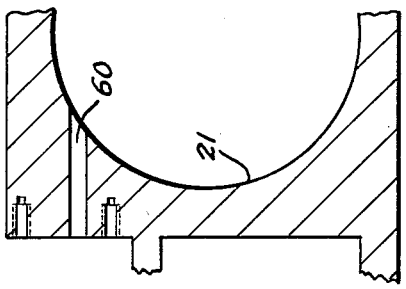
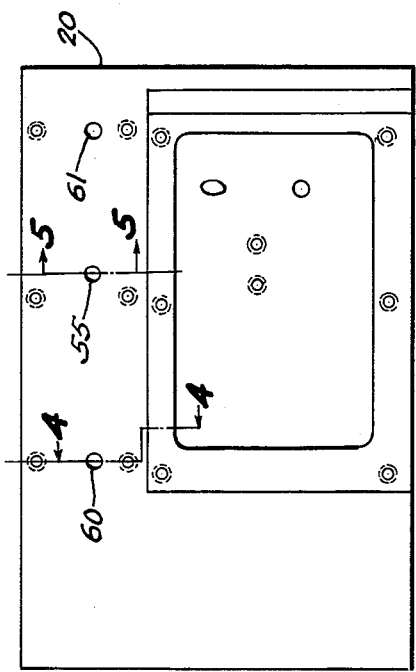
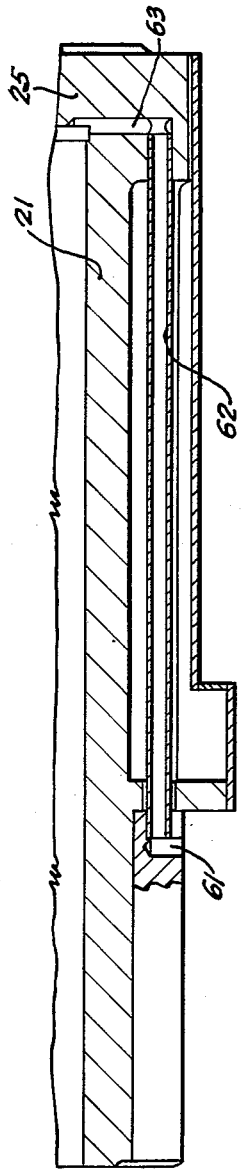

Jan. 17, 1956   J. W. LIGHT   2,730,994
ACTUATOR CONTROL SYSTEM AND VALVE MECHANISM THEREFOR
Original Filed Nov. 29, 1951   4 Sheets-Sheet 3

INVENTOR.
JAMES W. LIGHT
BY
HIS ATTORNEYS

Jan. 17, 1956   J. W. LIGHT   2,730,994
ACTUATOR CONTROL SYSTEM AND VALVE MECHANISM THEREFOR
Original Filed Nov. 29, 1951   4 Sheets-Sheet 4

INVENTOR.
JAMES W. LIGHT
BY
HIS ATTORNEYS

# United States Patent Office 2,730,994
Patented Jan. 17, 1956

2,730,994

ACTUATOR CONTROL SYSTEM AND VALVE MECHANISM THEREFOR

James W. Light, Greenville, Ohio, assignor to General Motors Corporation, Detroit, Mich., a corporation of Delaware Continuation of abandoned application Serial No. 258,938, November 29, 1951. This application February 24, 1953, Serial No. 338,348

18 Claims. (Cl. 121—40)

This invention relates to an improved fluid flow control mechanism and is a continuation of now abandoned application Serial No. 258,938, filed November 29, 1951.

It is among the objects of the present invention to provide a fluid flow control system and distributing mechanism particularly adapted to be used in connection with hydraulically operated actuators for power transmission purposes.

A further object of the present invention is to provide a fluid flow control system and distributing mechanism for an hydraulically operated actuator capable of being extended and contracted to transmit movement and having means for locking the actuator against movement at any selected point in its extending and contracting travel.

Further objects and advantages of the present invention will be apparent from the following description, reference being had to the accompanying drawings wherein a preferred embodiment of the present invention is clearly shown.

In the drawings:

Fig. 1 is a longitudinal, sectional view of an actuator adapted to be operated by hydraulic pressure or an electric motor and equipped with the fluid flow control device of the present invention.

Fig. 2 is a transverse sectional view of the actuator taken along the line and in the direction of the arrows 2—2 in Fig. 1;

Fig. 3 is a view of a portion of the side of the actuator taken in the direction of the arrow 3 in Fig. 1;

Fig. 4 is a fragmentary sectional view taken along the line and in the direction of the arrows 4—4 in Fig. 3;

Fig. 5 is a similar sectional view taken along the line and in the direction of the arrows 5—5 in Fig. 3;

Fig. 6 is a fragmentary, detail sectional view illustrating the transmission means for fluid from one point in the actuator to another;

Figure 10:
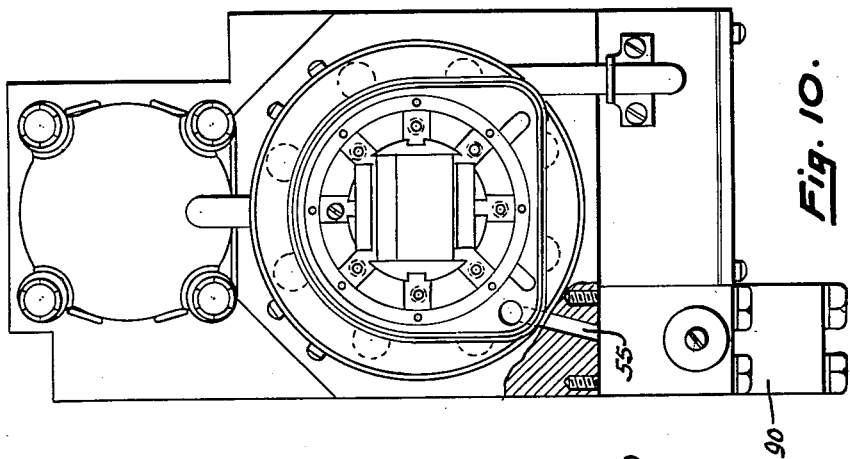
Fig. 10 is an end view of the actuator.
Figure 9:
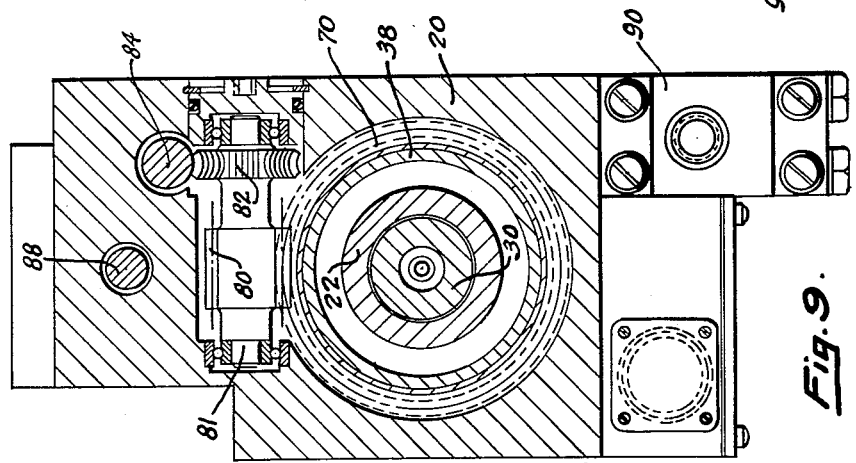
Fig. 9 is a sectional view taken substantially along the line and in the direction of the arrows 9—9 in Fig. 1.
Figure 7:
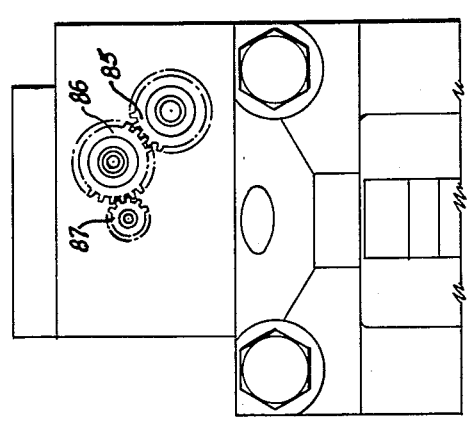
Fig. 7 is a partial top end view of the actuator.

The present invention relates to a fluid pressure control and distributing mechanism particularly designed and constructed for use on an actuator adapted to be installed on aeronautical conveyances and extensible and retractable for adjusting wing tips, stabilizers, rudders or any other movable part thereof. Such an actuator consists of two relatively movable portions, one of which is attachable to a stationary part of the conveyance while the other is secured to the movable part to be adjusted.

The particular actuator illustrated and to which the control mechanism is applied, is adapted to be driven by two separate motivating mediums, so that upon the failure of one, the other may be utilized to drive the actuator. Fluid pressure is the one power medium and an electric motor the other for driving the actuator, the fluid pressure being the main power drive and the electric motor the one used for emergency purposes. The fluid pressure is introduced into either end of a cylinder in which a reciprocative piston is disposed, said piston having an extension which forms the one movable portion of the actuator adapted to be secured to one part of the aerial conveyance while the cylinder, carried by the actuator housing, forms the other movable portion of the actuator to be attached to another part of the conveyance. As the piston is moved in one direction in the cylinder, the actuator is extended and as the piston is moved in the opposite direction the actuator is retracted. Inasmuch as the actuator is secured between two relatively movable parts of an aeronautical conveyance for the purpose of adjusting one relatively to the other, it is desirable that the actuator have means for locking it in any desirable adjusted position. To do this, the piston, mentioned above, is in the form of a nut threadedly mounted upon a screw shaft extending into a hollow projection on the nut and having its one end rotatably supported in the actuator housing. Thus when the non-rotatable piston is reciprocated in the cylinder the screw shaft is rotated thereby. Holding the screw shaft against rotation would prevent reciprocation of the piston threadedly mounted on said screw shaft and thus means are provided in this actuator for locking the screw shaft against rotation so that the piston may be held in any desirable adjusted position. This locking means consists of a member secured to the screw shaft, provided with notches engaged by a spring-loaded detent which under the effects of the spring lockingly engage the screw shaft to hold it against rotation. Piston means are interposed between the detent and the spring whereby through the medium of hydraulic pressure, the detent may be moved out of locking engagement with the screw shaft and thus release it in order to permit its rotation due to hydraulic reciprocation of the piston.

The second or emergency power medium for operating the actuator in case of failure of the fluid pressure power medium consists of an electric motor which is operatively connected with the detent to rotate the same upon energization of the electric motor. Thus, when the electric motor is rotated the detent, lockingly engaging the shaft, is rotated and consequently the screw shaft is also rotated. Rotation of the screw shaft results in reciprocation of the piston threadedly mounted thereon.

From the aforegoing it may be seen that the actuator is extended and retracted by reciprocation of the piston within its cylinder in one case under the effect of fluid pressure being exerted upon one side or the other of the piston, the screw shaft threadedly connected with the piston acting as an idler while the piston is reciprocated but adapted to act as a lock to prevent piston reciprocation and therefore hold the piston in any desirable operated position, while in the other case, particularly when the fluid pressure system is rendered inoperative, the electric motor as a power medium rotates the screw shaft, which results in a reciprocation of the piston in a like manner.

The present invention particularly relates to a fluid flow control and distributing mechanism for controlling the application of fluid pressure to the actuator. This mechanism comprises a single housing attachable to the housing of the actuator. Any suitable manually operable fluid flow control valve connected with a source of fluid pressure is attachable to the fluid flow control and distributing mechanism directly secured to the actuator.

Figure 13:
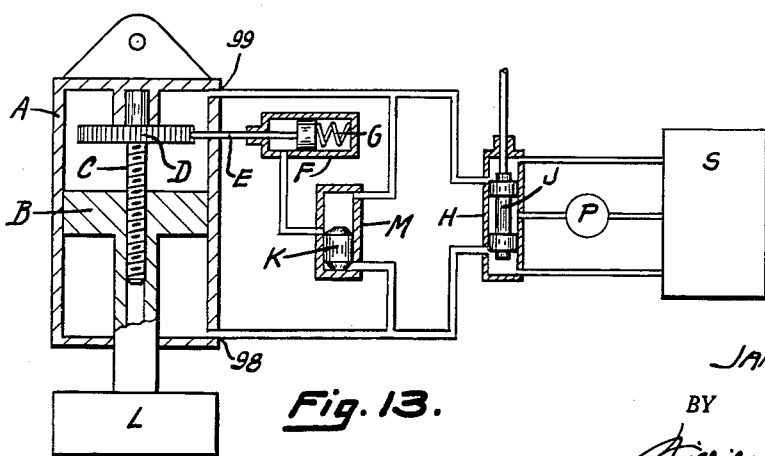
Fig. 13 is a schematic view illustrating a simple system of fluid pressure supply, distribution and control forming the basis for the more complicated functions of the mechanism of the present invention.

The Fig. 13 is a schematic view illustrating a simple system of fluid pressure supply and distribution adaptable in the simplest manner to control the operation of an actuator of the type shown in the present drawings. In this illustration the actuator is shown in the form of a cylinder A in which a reciprocative piston B is provided, having a piston rod extending from the cylinder and secured to a load marked "L." A screw shaft C is threadedly connected with the piston, the screw shaft having a notched disc D engageable by a ratchet or detent element E which is secured to a piston reciprocative in a cylinder F and urged by a spring G within the cylinder normally to hold the detent in locking engagement with the notched disc whereby its rotation is prevented and thus the reciprocation of the piston within the actuator is likewise prevented. A source of fluid supply marked "S" is connected with a fluid pressure pump "p" also connected to the intermediate portion of a cylinder H, the ends of said cylinder having communication with the reservoir or fluid supply tank S. In this cylinder, which is directly connected with the source of fluid supply, there is provided a control valve J having a stem by means of which the control valve may be operated manually. This cylinder H is connected with the respective ends of the actuator cylinder A and also with the respective ends of a cylinder M in which a shuttle valve K may be actuated in response to fluid pressure to connect the detent operating cylinder F with the fluid under pressure. Thus when the manually actuated valve J is moved into one position fluid under pressure is directed from the pump P through the manually actuated valve to one end of the actuator cylinder A for reciprocating the piston B in one direction, this fluid under pressure at the same time being directed past the intermediate valve K in cylinder M into the detent controlling cylinder F whereby the piston therein is moved against its spring pressure to release the notched disc D threadedly connected with the piston B so that said disc may rotate in response to the reciprocative movement of the piston B in the actuator. As soon as the flow of fluid under pressure ceases, movement of the actuator piston stops and at the same time fluid pressure existent in the detent controlling cylinder F is reduced whereby the spring G therein becomes effective again to urge the detent E into locking engagement with the notched disc D on the screw shaft C engaging the actuator piston B so that its reciprocation is thereby prevented. This simple control system is the basis for the more complete and complicated system used in connection with the actuator illustrated in the present drawings.

The actuator as illustrated consists of a housing 20 which is attachable in any suitable manner to one part of the aeronautical conveyance upon which the present device is used. This housing has the actuator cylinder 21 secured thereto in any suitable manner, one end of the cylinder extending from the housing 20, the other end of the cylinder extending into the housing 20. Within the cylinder there is provided a piston 22 having a central opening the interior surface of which has a spiral groove 23. Piston 22 has a tubular extension 24 secured thereto, this tubular extension being slidably supported in the outer end-head 25 of the cylinder 21 and having attached thereto any suitable mounting member or clevis 26 by means of which this piston extension may be anchored to one part of the aeronautical conveyance. A screw shaft 30 extends into the tubular extension 24 of the piston 22, the outer peripheral surface of said screw shaft having a spiral groove 31 corresponding with the spiral groove within the piston 22 through which said screw shaft extends, whereby the spiral grooves on the screw shaft and the piston 22 form a continuous spiral passage in which balls 32 circulate. This is a well-known method and means for operatively connecting a nut in the form of piston 22 with a screw shaft 30, this means being similar in action to the conventional screw-thread but offering lesser resistance or friction in a connection of this kind than the ordinary screw-thread. The one end of the screw shaft 30 has a disc-like head portion 35 rotatably supported within the housing 20 by the ball bearing 36 which is retained in the housing 20 by means of the cap 37 secured to the housing in any suitable manner and providing means by which this portion of the actuator may be anchored or attached to another part of the aeronautical conveyance.

The screw shaft head 35 has a cup-shaped element 38 secured thereto so as to rotate therewith, the outer annular edge of said cup-shaped member 38 being serrated so as to form an annulus of spaced ratchet teeth 39 which are engageable by similar ratchet teeth provided on the adjacent annular edge of the detent 40 which is ring-shaped. A series of springs 45 are seated within oppositely disposed recesses provided in the adjacent faces of the cup-shaped member 38 and the detent 40, these springs 45 normally exerting a force tending to separate the engaging ratchet teeth of the members 38 and 40. The detent ring 40 is, however, normally maintained in locking engagement with the cup member 38 on shaft 30 by means of a series of springs 50 contained within an annular chamber provided between the outer wall of the cylinder 21 and adjacent wall of a recess in housing 20. These springs 50 engage a piston assembly 51 slidable within the annular chamber within which said springs 50 are housed, the piston assembly 51 having operating pins 52 secured thereto which engage an end thrust bearing 54 also engaged by the detent ring 40. Thus springs 50 normally act to urge the engaged piston assembly 51 toward the detent ring 40, this piston assembly acting through the connecting pins 52 to urge the end thrust bearing member 54 against the detent ring 40 and thus yieldably maintain said detent ring in locking engagement with the cup-shaped member 38 secured to the screw shaft 30. A port 55 in the housing 20 communicates with an annular space provided between the piston 51 and the annular slidable sleeve 56 which supports the operating pins 52 secured to the piston assembly 51 whereby fluid under pressure may be introduced into this annular space adjacent the piston assembly 51 for compressing springs 50 so that the springs 45 between the cup-shaped member 38 and the detent ring 40, and weaker than the springs 50, may become effective to disengage the detent ring 40 from the cup-shaped member 38. Another port 60 in the housing 20 communicates with the interior of the housing into which the inner end of the cylinder 21 projects, thus providing means for introducing fluid under pressure into this housing chamber and against the left end of the reciprocative piston 22 as regards Fig. 1. Another port 61 in the housing 20 communicates with a pipe 62 provided in the actuator, as shown in Fig. 6, this pipe 62 terminating in a radial passage 63 provided in the end head 25 of the cylinder 21 and communicating with the interior of said cylinder whereby fluid may be introduced into the cylinder on the side of the reciprocative piston 22 therein opposite the side to which the port 60 introduces its fluid into the interior of the housing. It will be noted in Fig. 6 that pipe 62 is secured in the cylinder portion of the actuator and provides communication between the inlet port 61 and the port 63 leading to the one extreme end of the cylinder chamber.

The cup-shaped member 38 secured to the screw shaft 30 and rotatable therewith has a worm gear 70 rotatably supported upon its outer annular surface so as to be immovably axially thereof. This worm gear 70 has a cylindrical extension 71 surrounding the detent ring 40, the said extension 71 of the worm gear being provided with a plurality of spaced slots 72 into which prongs 73 extending outwardly from the detent ring 40 project. These prongs 73 extending into the slot 72 in the skirt 71 of the worm gear 70 secure the detent ring 40 to said worm gear 70 so that the said detent ring 40 must rotate with said worm gear 70 and may move axially relatively thereto in response to the effective springs 50 or 45.

Figure 8:
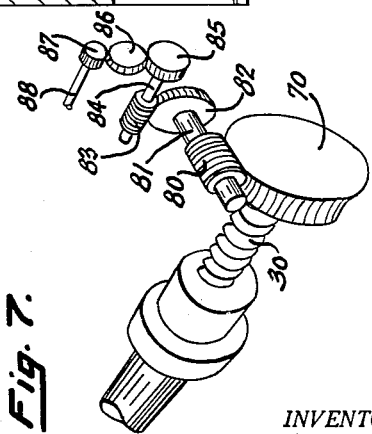
Fig. 8 is a perspective, schematic view of the gearing for connecting the electric motor driven shaft with the actuator.

Worm gear 70, as clearly illustrated in the perspective diagrammatic view Fig. 8 is operatively engaged by the worm 80 secured to shaft 81, said shaft having the worm gear 82 attached thereto which is operatively engaged by the worm 83. Worm 83 is mounted upon a shaft 84 which also has a gear 85 secured thereto, said gear meshing with an intermediate gear 86 operatively engaging the pinion 87 which is secured to the motor driven shaft 88. This motor driven shaft 88 is operatively connected to and driven by a reversible electric motor 90a attached to the actuator housing 20 in any suitable manner.

From the foregoing it may be seen that while the electric motor 90a and its interconnected gearing beginning with pinion 87 and terminating with the worm 80 operatively engaging the worm gear 70 will hold said worm gear 70 against rotation and consequently said worm gear 70 being connected with the detent ring 40 by the extending prongs 73 on said detent, the detent also will be held against rotation. Thus, this detent 73 locked against rotation as just described will, when urged into locking engagement with the ratchet teeth on the cup-shaped member, hold the cup-shaped member against rotation so that the screw shaft 30 attached to said cup-shaped member will also be held against rotation. As long as the screw shaft 30 is held non-rotatably, the nut piston 22 thereon will likewise be held against reciprocation even though fluid pressure be exerted against one side or the other of said piston 22. However, when the fluid under pressure introduced through port 55 into the space adjacent the piston 51, compresses springs 50 in moving the piston inwardly, springs 45 between the cup-shaped member 38 and the detent ring 40 are rendered effective to disengage the detent from the cup-shaped member thereby rendering the cup-shaped member 38 and its attached shaft 30 rotatable within the worm gear 70.

In order to render the piston 22 reciprocative in response to fluid under pressure being directed on either side thereof, the locking detent ring 40 must be moved out of locking engagement with the cup-shaped member 38 on said shaft 30, this disengagement being effected by fluid under pressure introduced against the piston 51. On the other hand, when the electric drive is to be used for operating the actuator, the locking detent ring 40 must be maintained in gripping engagement with the cup-shaped member 38 on shaft 30 so that the electric motor 90 acting through its train of speed reducing gearing as shown in Fig. 8 may rotate the said worm gear 70 which, as aforedescribed, is operatively connected with the locking detent ring 40 through the prongs 73 on said detent extending into slot 72 in said cup-shaped member 38.

The present invention relates particularly to the control and distribution mechanism for the fluid provided by a fluid pressure supply and introducible into the actuator to perform the proper actuator operating and detent releasing functions. This mechanism shown in Figs. 1, 9, 10 and 11 as applied to the actuator comprises a housing 90 consisting of a main body portion 91 and a cap portion 92 secured to the body portion by bolts 93. The housing portion 91 has a longitudinal through passage consisting of two different diameter portions 94 and 95, the outer end of the larger diameter portion 94 being sealingly closed by a cap 96 secured to the housing in any suitable manner, the opposite end of said through passage being closed by the housing portion 92 which has a duct 97 one end of which communicates with the interior of the opening 95 in housing portion 91, the other end terminating in a port 98 which may be termed the "retract" port of the device. Portion 92 of the housing 90 has a second port 99 referred to hereinafter as the "extension" port which has a duct 100 leading therefrom and communicating with the opening portion 95 of the housing portion 92 as shown in the schematic view, Fig. 12. A third port 105 in the housing portion 92 of the control mechanism has a duct 106 leading therefrom which communicates with a duct or passage 107 in the housing portion 91, said passage 107 having ducts 108, 109 and 110 leading therefrom, the ducts 108 and 109 providing communication between the passage 107 and the passage 95 in the housing portion 91 while duct 110 provides communication between the passage 107 and the passage or opening 94 in said housing portion 91. The retract port 98 and the extension port 99 are both connectible with a source of fluid pressure which forms no part of the present invention. For purposes of explanation, Fig. 13 shows the fluid pressure as being supplied by the pump P which draws fluid from the source of supply S and delivers it under pressure to an auxiliary manually controlled valve J within a valve housing H. Each end of this valve housing is in communication with the source of supply for the purpose of returning fluid to the source of supply under certain conditions. This valve J is manually operable from normal shut-off position into either one of two operated positions in one of which the fluid under pressure from the pump is directed to the retract port 98 of the fluid flow control mechanism or the other position in which the fluid under pressure is directed to the extension port 99 of said mechanism. The drain port 105 of the mechanism is connected at all times with the source of supply S. When the retract port 98 is connected to the pressure side of the pump P the auxiliary valve J will connect the extension port 98 with the source of supply directly and on the other hand, when the extension port 99 is connected to the pressure side of the pump by valve J, then the retract port 98 of the control mechanism is connected with the source of supply. This permits the fluid forced from the cylinder by the reciprocated piston to be exhausted into the supply reservoir S.

Figure 11:
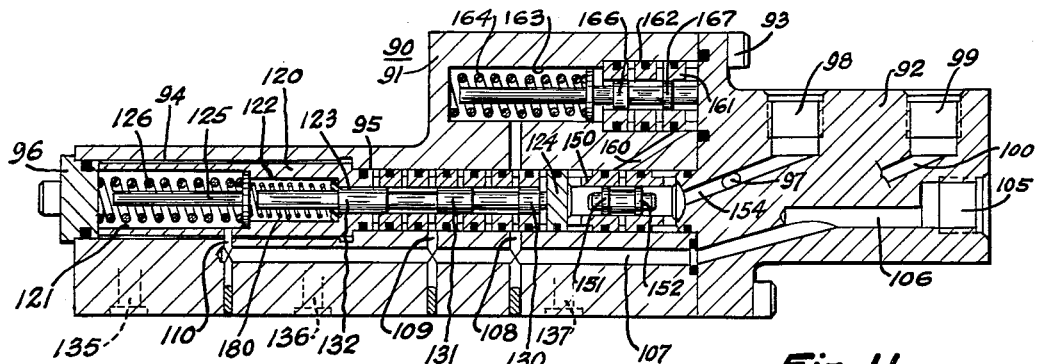
Fig. 11 is a longitudinal sectional view of the fluid flow control and distribution mechanism attachable to the actuator as shown in Fig. 1.

As shown in Fig. 11, the through passage comprising the two diameter portions 94 and 95 receive a valve casing 120, which has a central opening of three diameters, the largest being designated by the numeral 121, the intermediate by the numeral 122 and the smallest diameter portion by the numeral 123. The largest diameter opening 121 in the valve casing 120 is at the end of the housing passage 94 closed by the cap 96. The smallest diameter portion 123 has its end closed by a partition member 124 interposed between the valve casing 120 and the end of a tubular projection 150 formed on the housing portion 92 and extending into the opening 95 in the housing portion 91. A shoulder is formed between the two different diameter portions 121 and 122 in the valve casing 120, which is engaged by the head of a plunger 125 and is yieldably held in such engagement by a spring 126 interposed between the head of the plunger 125 and the sealing plug 96. This plunger is capable of a limited movement away from its normally engaged shoulder against the effect of the spring 126. A slide valve is reciprocatively supported within the smallest diameter portion 123 of the valve casing 120, this slide valve having two spaced annular grooves forming three separate casing engaging valve portions 130, 131 and 132. As shown in the diagrammatic view, Fig. 12 and also in the sectional view, Fig. 11, the housing 91 is provided with three pressure discharge ports 135, 136 and 137, the discharge port 135 being referred to hereinafter as the "retract discharge port" which, when the valve control mechanism 90 is assembled upon the actuator communicates with the port 61 in the housing 20 of said actuator. The discharge port 136 of the housing 90 is termed the "detent port" and communicates with the port 55 of the actuator housing. The port 137 of the control mechanism housing 90, termed the "extension port," communicates with the port 60 in the actuator housing. The retract discharge port 135 has a duct 138 leading therefrom and terminating in the valve casing opening 123. The extension port 137 has a duct 139 leading from it and terminating in the opening 123 of the valve casing 120. The detent discharge port 136 of the control mechanism has a duct 140 connecting said discharge port with the interior of the valve casing 120 between the stationary partition element 124 and the slide valve portion 130.

Within the opening portion 95 in the housing portion 91 and on the side of the partition 124 opposite the slide valve portion 130 there is provided a valve casing 150, formed by a tubular extension on housing portion 92 in which a shuttle valve having a central annular groove forming two spaced casing fitting flange portions 151 and 152 is slidably supported. The interior end of casing 150 adjacent the partition 124 is in communication with the extension inlet port 99 by means of a branch 153 of duct 100, while the opposite interior end of said casing 150 is in communication with the retract inlet port 98 by means of the duct 154 which is a branch of the duct 97. The intermediate portion of the interior of valve casing 150 has a duct 160 leading therefrom which is in communication also with one interior end of the valve casing 161. This valve casing is contained in the larger diameter portion 162 of a recess provided in the housing portion 91, the smaller diameter portion 163 of said recess containing a coil spring 164 which engages a flange provided on a valve which also has two spaced annular flange portions 166 and 167 slidable within the valve casing 161. The annular space between the flange portions 166 and 167 of this valve is in communication with the drain port 105 through a duct 170, said annular space also being in communication with the duct 140 by a duct 171, the duct 140, as mentioned heretofore, being in communication with the detent discharge port 136. The recess portion 163 has a fluid exhausting duct 172 leading from it and communicating with the drain port 105.

Figure 12:
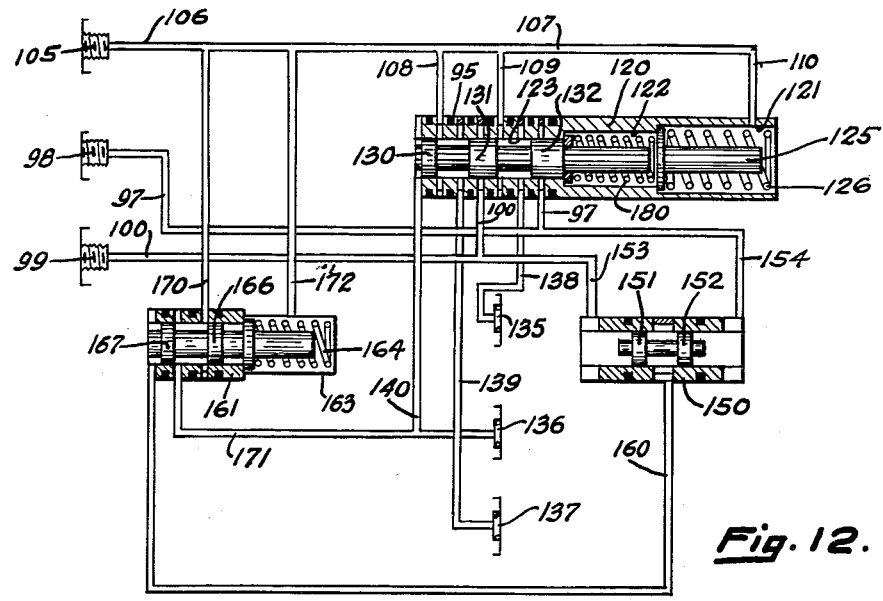
Fig. 12 is a schematic diagram illustrating the several valves and their interconnecting ducts and ports included in the control device.

Normally, the slide valve within the valve casing 120 is yieldably held in a position by a spring 180 so that the portion 130 of said valve normally maintains the duct 108, leading to the drain port, in communication with the duct 139 leading to the extension discharge port 137 as shown in Fig. 12. The valve portion 131 is of such a dimension lengthwise so that when in normal position it blocks or closes the duct 100 leading from the extension inlet port 99 while maintaining the duct 109, communicating with the drain port 105, in complete communication with the duct 138 leading to the retract pressure discharge port 135. The portion 132 of this valve normally maintains the duct 97, leading from the retract inlet port 98, closed. Thus the two ducts 100 and 97 leading respectively from the extension inlet port 99 and the retract inlet port 98 are normally blocked or kept out of communication by the respective valve portions 131 and 132, from the respective ducts 139 leading to the extension discharge port 137 and the duct 138 leading to the retard discharge port 135. At the same time, the extension discharge port 137 and its duct 139 is in complete communication with the drain port through the ducts 108 and 106 and likewise the retard discharge port 135 and its duct 138 is in complete communication with the drain port through the ducts 109 and 106. The valve urged by spring 180 into its normal position as shown in Figs. 11 and 12 is predeterminately spaced and disconnected from the head of the plunger 125 normally held against an interior shoulder in the valve casing 120 by the spring 126. Spring 126 is of greater strength than spring 180 so that when pressure is exerted upon the valve portion 130 to move it to the left in Fig. 11 or to the right in Fig. 12, spring 180 will yield to permit the valve to be moved against the effect of this spring so as to engage the head of the plunger 125, continued movement of the valve under pressure then moving the plunger 125 against the heavier or greater resisting effort of spring 126.

The fluid flow control valve mechanism of the present invention operates in the following manner; assuming that a valve of the type J as shown in Fig. 13 is connected with the retract and extension inlet ports 98 and 99 of the mechanism and that in turn, said valve is in communication with a fluid pressure delivering pump P, and assuming that the operator of the aeronautical conveyance actuates valve J to connect the pressure delivery side of the pump with the retract inlet port 98 under which condition the extension port 99 is connected with the fluid supply in any suitable manner, fluid under pressure from the pump will enter the retract port 98 and pass through the duct 97, this fluid under pressure, however, not being able to enter into the valve casing 120 inasmuch as the portion 132 of the valve therein has it blocked. Thus, the fluid under pressure will pass through the branch duct 154 into the one end of casing 150 housing the shuttle valve, fluid pressure against flange 152 moving said shuttle valve to the left as regards Fig. 12, thereby connecting the duct 154 with duct 160. From the duct 160 the fluid pressure passes into the interior of valve casing 161, exerting a pushing effort against the valve portion 167 to move this valve toward the right as regards Fig. 12 against the resisting effort of the spring 164. In response to the movement of this valve the portion 167 thereof will assume a position in which the duct 171 is placed in communication with the duct 160, said duct 171 being in communication with the duct 140, one portion of which leads to the detent discharge port 136 of the control device which, as has been mentioned, is in communication with the retract passage or duct 55 in the actuator housing, said duct leading to the space adjacent the detent releasing piston 51. The other portion of duct 140 leads to the one end of the casing 120 in which the slide valve is supported so that pressure is exerted against the end portion 130 of this slide valve. The fluid pressure being exerted against the detent locking piston 51 tends to urge said piston against the effect of springs 50 to remove its detent locking force and thereby permit the springs 45, between the detent and its engaged cup-shaped member 38, on screw shaft 30, to become effective to disengage the detent from said cup-shaped member. However, springs 50, urging the piston into detent locking position, are comparatively stronger than the spring 180 urging the slide valve into its normal position and therefore the fluid pressure will move said slide valve against the effect of its spring 180 before the piston 51 will be able to be moved by pressure to cause its springs 50 to yield. When the slide valve is so actuated by fluid pressure it is first moved into engagement with the spring-pressed plunger 125 whose spring is stronger than the spring 180. At the time the slide valve engages the head of plunger 125 the portions 131 and 132 of said slide valve will still cover the ducts 100 and 97, respectively, to prevent their discharge into the valve shell or casing 120, thus preventing any fluid discharge into the cylinder 21 of the actuator. In addition when the slide valve engages the head of plunger 125, lands 130 and and 131 thereof will cover ducts 108 and 109 thus hydraulically locking the actuator piston within the cylinder by preventing any flow of fluid from both the retract and extend chambers. Continued pressure upon the slide valve now engaging the spring-pressed plunger 125, will attain a value which is sufficient to actuate the brake release but insufficient to move spring loaded plunger 125. This is accomplished by the fluid pressure passing from duct 171 to the pressure outlet port 136 which is in communication with the actuator duct 55 leading to the brake release piston 51. As soon as the piston 51 is actuated to release the brake and thus free the screw shaft, then the increasing fluid pressure upon plunger 125 will move said plunger against the opposition of its spring 126 so that the portions 131 and 132 of the said slide valve will uncover their respective ducts 100 and 97 thereby permitting fluid under pressure to be directed from duct 97 into the interior of the casing 120 and then into duct 138 to the retract discharge port 135 which communicates with the duct 61 in the actuator housing, said duct being in communication with the outer end of the cylinder 21 via the pipe 62 and the radial duct 63 in the actuator head 25. Thus, fluid under pressure delivered at this end of the cylinder 21 is directed against the one end of the piston 22. The piston 22, in response to the fluid pressure in the end of the cylinder adjacent the head 25 thereof may move axially of shaft 30 and in response to said movement the fluid in the chamber on the opposite side of the piston will be forced through the actuator passage 60 and its communicating extension port 137, from whence said fluid will exit through the duct 139, enter the valve casing 120 of the slide valve and pass into now open passage 100 to the extension inlet port 99 of the control device which is in communication with a portion of the manually actuated valve J to permit the exhausting of this fluid to the fluid supply reservoir S.

When the operator desires to stop retraction movement, he manipulates the manually actuated fluid flow control valve J to its normal shut-off position, whereby pressure in the retract port 98 and its connected ducts is reduced. Therefore, pressure acting against the portion 130 of the slide valve is also reduced, permitting the spring 126 on the plunger 125 to operate said plunger to return the slide valve toward normal position. Now the portions 131 and 132 of the valve will again block the respective ducts 100 and 97, and the ducts 108 and 109, which cause the actuator piston to be hydraulically locked in position inasmuch as neither end of the cylinder can then discharge the fluid therein, since ducts 100, 97, 108 and 109 are closed. At this time the pressure against the detent releasing piston 51 is still being exerted and thus the detent ring 40 is still out of locking engagement with the screw shaft member 38. Reduction in pressure permits spring 164 to move its valve so that portions 166 and 167 thereof are returned to normal position in which the detent discharge port 136 is in communication with the drain port via the ducts 170 and 106. This permits springs 50 again to become effective to move the piston 51 and the detent ring 40 into locking engagement with the cup-shaped member 38 on screw shaft 30 and consequently mechanically lock the screw shaft against further rotative movement.

Continued reduction in the fluid pressure permits spring 180 to become effective, moving the slide valve into its normal home position in which position the retract discharge port 135 and its communicating passage 61 of the actuator which leads to the end of the cylinder adjacent the head 25 is connected through the slide valve casing 120 with the ducts 109 and 106 communicating with the drain port 105. In this manner the pressure of the fluid which always fills the actuator cylinder is relieved by the opening of drain port 105. At the same time the extension discharge port 137, communicating with the opposite end of the cylinder through the actuator passage 60, is connected via the valve casing 120 and ducts 108 and 106 with the drain port 105 and therefore the fluid in this end of the cylinder will also be relieved of its pressure through the open drain port. It may be well to note that the actuator cylinder chambers are always maintained full of hydraulic fluid medium as the existence of a void or air pocket therein will render the actuator inoperative.

As is apparent from an examination of Fig. 1, the areas of the piston exposed to the retract and extend chambers of the actuator cylinder are different, with the larger area thereof being exposed to the pressure fluid in the extend chamber and the smaller area thereof being exposed in the pressure fluid existent in the retract chamber. During operation of the actuator by the electric motor, the fluid medium must be allowed to circulate to and from the sump or reservoir S. By reason of the piston areas being different, the fluid displacement from the chambers during piston movement therein is likewise different. Accordingly, the ducts 108 and 109 of the slide valve are normally open thereby permitting the flow of fluid to and from the actuator chamber to always maintain the chambers filled with the incompressible fluid medium. A minimum back pressure is maintained in the lines at all times to achieve this result.

From the aforegoing it will be seen that normally both ends of the actuator cylinder 21 are in communication with the drain port 105, permitting any fluid in either end of the cylinder to be exhausted through the drain port and the manual control valve J to the source of fluid supply. This same condition will obtain in case of fluid pressure failure so that the emergency use of the electric motor drive under these conditions may be effected. Now, when the motor 90a is energized and drives the worm gear 70 through the speed reducing train of gearing interposed between the shaft 88 of the electric motor 90a and said worm gear 70, rotation of the worm gear 70 will rotate the detent ring 40 and, due to the fact that it is held in locked engagement with the screw shaft cup-shaped member 38, said screw shaft will be rotated. As the screw shaft 30 is rotated by the motor in either one direction or the other, the piston 22 will be reciprocated in one direction or the other and therefore may discharge any fluid on either side of the piston inasmuch as the cylinder ends are open to drain. The electric motor 90a is operated in one direction or the other in response to actuation of any suitable electric switch which may be operatively connected or attached to the same manually operable member connected to the fluid flow control valve J. Such a switch, of standard design, may have a pressure actuated cylinder which, while the pressure system for operating the actuator is effective, renders the electric switch ineffective during manipulation of the manually actuated fluid control valve J. However, if the hydraulic system is rendered inoperative, the electric switch will automatically be rendered effective to cause motor operation in response to manipulation of the manual means for also actuating the switch J.

While the embodiment of the present invention as herein disclosed, constitutes a preferred form, it is to be understood that other forms might be adopted.

What is claimed is as follows:

1. A control system for a fluid pressure operated actuator having a cylinder with a lineally movable member therein capable of fluid pressure actuation in either direction and releasable locking means normally operative to restrain movement of said member in the absence of fluid pressure actuation, comprising in combination, a source of incompressible fluid medium under pressure, first valve means operable to trap incompressible fluid medium in said cylinder to prevent movement of said member, second valve means operatively connected with said first valve means and operable to admit fluid under pressure from said source to release said locking means while the member is held against movement by the fluid medium trapped in said cylinder by the first valve means, and third valve means operatively connected with said first and second valve means and operable to admit fluid under pressure from said source to said cylinder to effect movement of said member while the locking means are maintained released by said second valve means and the fluid medium in the cylinder is no longer trapped by said first valve means.

2. A control system for a fluid pressure operated actuator of the type having a cylinder with a lineally movable piston disposed therein and locking means normally operative to prevent movement of said piston, but releasable by fluid pressure operated means to permit movement of said piston, including in combination, a source of incompressible fluid medium under pressure and a control valve in circuit connection between said source and said cylinder for applying fluid under pressure from said source to either side of said piston, the circuit connection between said control valve and said cylinder including a plurality of serially interconnected servo-actuated valves, one of said servo-actuated valves being operatively connected to said cylinder and another of said valves being operatively connected with said lock releasing means, the construction and arrangement of said servo-actuated valves being such that the following sequence of actions occur upon operation of said control valve to apply fluid under pressure to either side of said piston; initially the piston is held against movement by incompressible fluid medium trapped in the cylinder; then, the locking means are released by fluid under pressure; and finally fluid under pressure is applied to said cylinder to effect piston movement.

3. A control system for a fluid pressure operated actuator of the type having a cylinder with a lineally movable piston disposed therein and locking means normally operative to prevent movement of said piston, but releasable by fluid pressure operated means to permit movement of said piston, including in combination, a source of incompressible fluid medium under pressure and a control valve in circuit connection between said source and said cylinder for applying fluid under pressure from said source to either side of said piston, the circuit connection between said control valve and said cylinder including servo-actuated valve means having fluid circuit connection with the cylinder and the lock releasing means, the construction and arrangement of said valve means being such that upon actuation of said control valve, fluid under pressure is applied to release said locking means while the piston is held against movement by trapped incompressible fluid medium in the cylinder, before fluid under pressure is applied to said cylinder to effect movement of said piston.

4. The combination set forth in claim 3 wherein the servo-actuated valve means connected to the cylinder and lock releasing means are spring loaded, the construction and arrangement being such that upon actuation of said control valve to stop the application of fluid under pressure to either side of said cylinder, the piston is held against movement by trapped incompressible fluid medium in the cylinder, before the fluid pressure is relieved from said lock releasing means.

5. A control system for a fluid pressure operated actuator of the type having a cylinder with a lineally movable piston disposed therein and locking means normally operative to prevent movement of said piston, but releasable by fluid pressure operated means to permit movement of said piston, including in combination, a source of fluid pressure, a control valve in circuit connection with said source and said cylinder for applying fluid under pressure from said source to said cylinder, the circuit connection between said control valve and cylinder including a pair of serially interconnected, sequentially operable spring biased servo-actuated valves having fluid circuit connection with the cylinder and the lock releasing means, said servo-actuated valves being so constructed and arranged that upon operation of the control valve for applying fluid under pressure to said cylinder, fluid under pressure is applied to release said locking means before fluid under pressure is applied to the cylinder to cause piston movement.

6. In combination with an actuator having a cylinder in which a fluid pressure reciprocative piston is threadedly connected to a screw shaft extending axially through said piston and cylinder and a spring loaded detent normally engaging said screw shaft to lock it against rotation, said detent being operative by fluid pressure to release said screw shaft, of a unitary, fluid pressure flow control valve mechanism attachable to said actuator, said valve mechanism having three outlet ports each communicating with an end of the actuator cylinder and with the locking detent respectively, three ports, two of which are fluid inlet ports respectively connectible to a source of fluid under pressure, the third a drain port connectible to a fluid supply reservoir, the unitary control valve mechanism consisting also of three separate but interconnected valves one of which, a shuttle valve, is connected to the two inlet ports and to the second or release valve and is operative in response to fluid pressure from either inlet port to connect said port with the release valve for actuating it to direct the fluid pressure to the detent and to the third, or servo-valve, with which it is connected, said servo-valve also being connected to the outlet ports communicating with the ends of the actuator cylinder and also with the drain port and normally connecting said outlet ports with the drain port, and also being connected with both pressure inlet ports, said connections normally being closed by the servo-valve, which, in response to fluid pressure from the release valve is actuated before the spring loaded detent, first to block the connection between the drain port and the outlet ports communicating with the ends of said actuator cylinder whereby the actuator is locked by the trapped fluid medium within the cylinder before the screw shaft is released for rotation, the drain connections of said servo-valve now being closed to the outlet ports, increasing pressure fluid due to the prevention of piston movement by the trapped fluid within the actuator cylinder actuates said detent to release the screw shaft and permit its rotation, the piston being immovable by reason of the trapped fluid in the cylinder, the increasing pressure fluid actuates the servo-valve to connect the pressure delivering inlet port with its respective outlet port leading to the cylinder whereby pressure fluid is exerted upon the piston in one direction permitting movement thereof in said one direction, the servo-valve also connecting the other pressureless inlet port to its respective outlet port communicating with the other end of the cylinder for fluid exhaust purposes.

7. A device in accordance with claim 6, in which both the release valve and the servo-valve are spring loaded, the release valve to a lighter degree than the servo-valve and the servo-valve to a substantially lighter degree than the detent, whereby reduction of fluid pressure will effect actuation of the servo-valve to close both the fluid outlet passages and trap fluid in the cylinder for holding the piston therein immovable until the release valve is spring actuated to connect the detent outlet with the drain outlet and thereby effect spring actuation of the detent to engage and lock the actuator screw shaft.

8. A device in accordance with claim 6, in which a spring urges the release valve into normal position, and another, stronger spring urges the servo-valve into its normal position, the springs of both valves being weaker than the springs of the detent, whereby, upon diminishing fluid pressure the servo-valve is spring moved to close its port connections with the actuator cylinder and thereby trap fluid therein for locking the piston in the cylinder against movement until the release valve is spring actuated to connect the detent port with the drain port for effecting spring operation of the detent to engage and lock the screw shaft against rotation, the spring in the servo-valve now having moved the valve into normal position in which both outlet port connections thereof are placed in communication with the drain outlet and both inlet connections are held closed.

9. A fluid flow control valve mechanism for an actuator, said mechanism comprising a housing attachable to the actuator and having fluid passages providing two fluid inlet ports, a drain port, and three fluid outlet ports, said outlet ports communicating with the interior of said actuator; a servo-valve plug slidable in a recess in the housing, said recess having communicating connections with the drain port, both inlet ports and all three outlet ports; a spring loaded plunger in said recess, yieldably urged against a positive stop therein; a spring normally yieldably urging the servo-valve plug to block the two inlet port connections from the outlet port connections and from the drain connections with said recess, the valve plug being spaced from the plunger normally; and valve controlled connections between both inlet ports and the one outlet port and servo-valve recess at the end of the recess opposite the spring pressed plunger.

10. A fluid flow control valve mechanism for an actuator, said mechanism comprising a housing attachable to the actuator, said housing having valve chamber and ducts connecting said chamber with two fluid inlet ports, a drain port and three fluid outlet ports which communicate with the interior of the actuator when the housing is applied thereto; a slide valve in the valve chamber; a spring loaded plunger normally, yieldably urged against a positive stop in said chamber; a spring, weaker than the plunger spring, interposed between the plunger and slide valve and yieldably holding said slide valve so that it shuts off communication between the fluid intake ports and said chamber and is spaced from the plunger; and a shuttle valve connected to both inlet ports and to the one outlet and the slide valve chamber, said shuttle valve acting in response to fluid pressure from one or the other inlet port to connect said pressure delivering port with both the slide valve chamber and the one outlet port.

11. A unitary fluid flow control mechanism comprising a housing provided with two fluid inlet ports, three fluid discharge ports, one drain port, three valve chambers, and ducts interconnecting the ports and valve chambers; a spring loaded slide valve in the first valve chamber normally blocking communication between the two inlet ports and two discharge ports, while maintaining communication between said two discharge ports and the drain port, said valve being operative by fluid pressure to establish communication between each inlet port and a respective discharge port; a valve in the second valve chamber normally blocking communication between the two inlet ports and the third valve chamber, said valve in the second chamber being operative in response to fluid pressure from one or the other inlet ports, to connect the presure port with said third valve chamber; and a spring loaded valve in the third valve chamber, normally blocking communication between the second valve chamber and a duct leading from said third valve chamber to both the third discharge port and the first valve chamber, said third valve normally maintaining communication between the third discharge port and the drain port but being operative in response to fluid pressure from said second valve chamber to establish communication between said second valve chamber and the first valve chamber and third discharge chamber and blocking the duct leading to the drain port.

12. A device in accordance with claim 11 in which the springs of the valves in the first and third valve chambers are so calibrated relatively that, upon reduction of fluid pressure from an inlet port, the valve in the first valve chamber is spring actuated to discontinue communication between the two fluid inlet ports and the discharge ports to which they are respectively connected by said valve, before the valve in said third valve chamber is spring actuated to block communication between the second valve and said third discharge port, and to complete communication between said third discharge port and the drain port.

13. A fluid flow control mechanism for an actuator, said mechanism comprising a housing attachable to the actuator, said housing having valve chambers, fluid inlet, discharge and drain ports, and ducts interconnecting said chambers and ports, the discharge ports communicating with the interior of the actuator when the housing is applied thereto; a spring loaded plunger in the one valve chamber normally, yieldably urged against a positive stop in said one chamber; a slide valve in said one chamber normally shutting off communication between said one chamber and the two fluid inlet ports while maintaining communication, via said chamber, between two of the discharge ports and the drain port; a spring, weaker than the spring of the plunger, interposed between said plunger and slide valve, yieldably holding the slide valve in normal position spaced from the plunger; and a pressure actuated valve in another chamber of the housing, connected to both fluid inlet ports, to the third fluid discharge port and to the end of the valve chamber occupied by the slide valve, said pressure actuated valve acting, in response to fluid pressure from one or the other inlet ports to connect the pressure inlet port with said third discharge port and the slide valve chamber, for actuating the slide valve to open communications between the pressure delivering inlet port and one of the said two discharge ports and between the inactive inlet port and the second of the said two discharge ports.

14. A device in accordance with claim 13 in which a second spring loaded, pressure actuated valve communicates with the first pressure actuated valve, the third discharge port and slide valve chamber and the drain port, said second pressure actuated valve normally connecting the slide valve chamber and third discharge port with the drain port and disconnecting the second pressure actuated valve from said third discharge port and from the slide valve chamber, but being operative, in response to pressure actuation of the first pressure actuated valve, for completing communication between the pressure delivering inlet port and the third discharge port and slide valve chamber.

15. A fluid flow control mechanism for an actuator consisting of a cylinder provided with a reciprocative piston, threadedly connected with an axial shaft adapted to be locked against rotation, to prevent piston reciprocation, by a detent urged into locking engagement with said shaft by a spring loaded piston which is operative by fluid pressure to release said shaft, said mechanism comprising in combination, a housing to be attached to the actuator, said housing having two fluid pressure inlet ports, a drain port, three fluid pressure discharge ports, the first of which communicates with one end of the actuator cylinder, the second with the opposite end of said cylinder and the third with the detent actuating piston of the actuator, three valve chambers and ducts interconnecting the valve chambers and the inlet and discharge ports; a plunger in the first valve chamber yieldably urged by a spring against a positive stop therein; a slide valve in said first valve chamber, yieldably held in normal position and axially spaced from said plunger by a spring weaker than said plunger spring and interposed between the slide valve and plunger, the slide valve, when in normal position blocking the connections of the valve chamber with the two pressure inlet ports and maintaining communication between the first and second discharge ports and the drain port; a pressure actuated shuttle valve in the second valve chamber each end of which is connected with one of the two pressure inlet ports respectively while the intermediate portion of said second valve chamber is connected to one end of the third valve chamber, the shuttle valve being operative to connect one or the other of said pressure inlet ports with the third valve chamber in response to fluid pressure from one or the other of said ports respectively; a spring loaded plunger valve in said third valve chamber, normally blocking communication between the shuttle valve chamber and a duct leading from said third chamber to both the third fluid discharge port and the end of the first valve chamber opposite the plunger therein, said plunger valve normally maintaining communication between said last mentioned duct and another leading from the third valve chamber to the drain port, said plunger valve when actuated by fluid pressure from the shuttle valve permitting said pressure to be directed to the first valve chamber and to the third discharge port to actuate the slide valve for connecting the inlet ports with their respective discharge ports one of which delivers fluid pressure to one cylinder end of the actuator the other providing a fluid exhaust passage for the other end of the actuator cylinder, after actuation of the detent piston by fluid pressure from the third discharge port for releasing the actuator shaft and permitting reciprocation of the actuator piston.

16. A unitary fluid flow mechanism consisting of a housing having a plurality of ducts interconnecting three valve chambers, two fluid pressure inlet ports, a drain port and three pressure discharge ports in said housing; a distributing valve slidable in the first of said valve chambers and spring urged into normal position in which it shuts off communication between each inlet port and a respective discharge port while maintaining communication between said two respective discharge ports and the drain port; a shuttle valve in the second valve chamber having communication with both inlet ports and one end of the third valve chamber, said shuttle valve being operative by fluid pressure to connect either one or the other pressure delivering inlet ports with the third valve chamber; and a spring loaded valve in said third valve chamber, normally, yieldably held to shut off communication between the second valve chamber and the third discharge port and first valve chamber while maintaining communication between the drain port and said third discharge port and second valve chamber, this third valve being operative by fluid pressure to complete communication between the second valve chamber, the first valve chamber and the third discharge port for actuating the valve in said first chamber.

17. In combination with an actuator having a cylinder in which a fluid pressure reciprocative piston is threadedly connected to a screw shaft extending axially through said piston and cylinder and a spring loaded detent which normally engages said screw shaft to lock it against rotation, said detent being operative in response to fluid pressure to release the screw shaft and permit its rotation, of a unitary, fluid pressure flow control mechanism attachable to said actuator, said valve mechanism having a plurality of ports, three of which are fluid pressure outlet ports one of which communicates with one end of the cylinder, the second with the other end of the cylinder and the third with the detent, the fourth and fifth ports being inlet ports connectible to a source of fluid pressure and the sixth port being a drain port connectible to the fluid supply, said control mechanism having three separate but interconnected valves, one a shuttle valve connected to the two inlet ports and to the second, spring loaded release valve, both the first and second valves being connected to the third or servo-valve with is also connected to both inlet ports and to the drain port, said servo-valve having two springs, one weaker than the other for successively opposing actuation of the servo-valve by fluid pressure.

18. A control system for a fluid pressure operated actuator having a cylinder with a lineally movable member therein capable of fluid pressure actuation in either direction and locking means operative to restrain movement of said member, including in combination, a source of incompressible fluid medium under pressure, a valve connected with said cylinder and operable to trap incompressible fluid medium therein so as to prevent movement of said member, means operable to release said locking means while the member is held against movement by the trapped fluid medium in said cylinder, and a second valve operable to admit fluid under pressure from said source to said cylinder to effect movement of said member with the locking means released, said second valve being operatively connected with said first recited valve whereby pressure fluid is admitted to said cylinder from said source only after fluid medium is no longer trapped in said cylinder.

References Cited in the file of this patent

UNITED STATES PATENTS

| 1,258,860 | Blaylock | Mar. 12, 1918 |
| 1,479,440 | Abele | Jan. 1, 1924 |
| 1,847,688 | Couwenhoven | Mar. 1, 1932 |
| 2,352,184 | Bullard | June 27, 1944 |
| 2,552,604 | Thoma | May 15, 1951 |

FOREIGN PATENTS

| 436,271 | France | Jan. 19, 1912 |